(12) United States Patent
Owens et al.

(10) Patent No.: US 7,164,921 B2
(45) Date of Patent: Jan. 16, 2007

(54) AUXILIARY SWITCH ACTIVATED GPS-EQUIPPED WIRELESS PHONE

(75) Inventors: Dean Owens, Manchester, NH (US); Robert K. Tendler, Chestnut Hill, MA (US)

(73) Assignee: Tendler Cellular, Inc., Boston, MA (US)

( * ) Notice: Subject to any disclaimer, the term of this patent is extended or adjusted under 35 U.S.C. 154(b) by 888 days.

(21) Appl. No.: 09/750,865

(22) Filed: Dec. 28, 2000

(65) Prior Publication Data

US 2004/0180668 A1 Sep. 16, 2004

Related U.S. Application Data

(60) Provisional application No. 60/212,155, filed on Jun. 16, 2000.

(51) Int. Cl.
H04M 11/04 (2006.01)
G08B 1/08 (2006.01)

(52) U.S. Cl. .............. 455/456.1; 455/404.1; 455/403; 455/520; 340/539.11

(58) Field of Classification Search .......... 455/404.1, 455/403, 556.1, 556.2, 521, 564; 340/539.11, 340/539.12, 539.13, 539.18, 539.19
See application file for complete search history.

(56) References Cited

U.S. PATENT DOCUMENTS

| 5,598,460 A * | 1/1997 | Tendler ............... 455/404.2 |
| 5,736,962 A * | 4/1998 | Tendler ............... 342/357.1 |
| 6,014,555 A * | 1/2000 | Tendler ............... 455/404.1 |
| 6,239,700 B1 * | 5/2001 | Hoffman et al. ....... 340/539.13 |

* cited by examiner

Primary Examiner—Temica Beamer
Assistant Examiner—S. Smith
(74) Attorney, Agent, or Firm—Robert K Tendler

(57) ABSTRACT

A wireless phone having an internal GPS-receiver is turned on by an auxiliary switch coupled to a Microwire bus for turning on the phone and the internally carried GPS receiver so that the phone can be made to call a predetermined number and report location. If the switch closure is a result of paging, a phone can be paged to report location whether or not the phone is initially off. This accommodates such applications as Alzheimer patients, truck-tracking, kid-tracking, pet-tracking and in general any application in which a wireless communications device such as a cell phone can be caused to report location, with the phone initially in an off condition. Alternative activations through the closure of specialized switches responsive to airbag deployment, car alarm activation, medical condition alerts, and perimeter violations, provides local activation of the system.

9 Claims, 3 Drawing Sheets

AUXILIARY SWITCH ACTIVATED GPS-EQUIPPED WIRELESS PHONE

This application claims priority from U.S. Provisional Application No. 60/212,155 filed Jun. 16, 2000 the entire contents of which are hereby incorporated by reference.

FIELD OF INVENTION

This invention relates to telecommunications and more particularly to auxiliary switch activated GPS-equipped wireless phones.

BACKGROUND OF INVENTION

Cell phones can be provided with an integrally mounted GPS receiver powered by the cell phone battery, the purpose of which is to detect position and to report position to a dispatcher or other type of office through the utilization of the cellular network. Such systems are illustrated in U.S. Pat. Nos. 5,598,460; 5,730,962; 5,649,059 and 4,833,477. In one embodiment, the report of location is done through a synthetically generated voice. This is done with a speech synthesizer which is driven by the NMEA0183 output of an onboard GPS receiver which, when decoded, provides a verbal string reporting latitude and longitude of the device.

As a recent development, the cellular phone can be made to report the latitude and longitude via a DTMF tones likewise transmitted over the voice channel, or alternatively transmitted over a control or separate channel.

These phones are typically provided with an emergency button, which when depressed activates the phone to provide position reporting after first dialing a predetermined number.

While it is indeed possible to provide wireless phones with activation, either with touchtones or via some other digital signaling system, these systems only work when the phone is turned on.

There are several scenarios which require a remote sensory switch to be able to activate a wireless phone. These are described in the aforementioned U.S. Pat. No. 5,598,460. It will, however, be appreciated that when an auxiliary activation is required, it may not be the case that the phone itself has been turned on or in fact that the GPS contained in the phone has been turned on. This provides a not-completely automatic system in so far as the user of the system must first provide a separate action to turn on the phone.

In the case of vehicle-mounted phones, it may not be the case that the phone itself is turned on when it is desired, for instance, to page the phone and to have it call a predetermined dispatch office. Such would be the case in, for instance, locating errant rental cars, waylaid trucks or other commercial vehicles or in fact locating individuals who have not turned on their phones. One example of the latter scenario is the case when the US Army trains troops. Typically, the training is over a month's period of time, in the woods or a remote terrain. According to the US Army, as many as six out of three hundred trainees can be lost in the one-month period. It is therefore important to be able to locate these trainees with the system that does not drain the battery. If the phone was kept on for an extended period of time, the battery would run down and the trainee would not be able to be located.

Likewise for prisoners, Alzeimers patients, children or individuals who do not wish to turn on the phone, their whereabouts can be ascertained by paging the phone if the phone where in fact turned on at the time.

SUMMARY OF THE INVENTION

In order to solve this problem, the subject system senses the closure of a switch and turns on both the phone and the GPS receiver. This provides completely automatic auxiliary phone turn on and location reporting activation through the utilization of an onboard or separately coupled identifiable switch and the utilization of a so-called Microwire Interface.

The Microwire Interface utilizes a two-wire bus structure which responds to switch closures by indicating the switch closure and identifying which switch is closed in the subject system. The fact of a switch closing and its identity causes the phone not only to turn on and not only to report location but to dial a predetermined number associated with the particular switch closed.

For instance, if one seeks to page the phone, the on-board pager is paged which results in a switch closure, for instance a switch designated switch #1. The Microwire Interface detects this switch, causes the phone to turn on, powers the GPS-receiver and initiates a call to a predetermined number to report location. In this way vehicles having such a phone can be located whether or not the phone is turned on. Otherwise individuals or packages can be located by merely paging them.

Moreover, if an airbag is deployed on a vehicle, a predetermined switch may be closed, with the switch closure being sensed by the Microwire Interface. This switch may be designated Switch #2. Switch #2 ,is detected by circuitry within the phone to indicate that it is the airbag that is deployed indicating a vehicle accident. The verbal string and the DTMF string may be made to provide an indication of which switch was activated, namely a crash sensor. Alternatively the mere fact of assigning a predetermined phone number to a switch identifies what switch has been activated when this number is called.

Further, a vehicle alarm may cause a relay to close, thus providing a third switch closure, with the Microwire Interface then turning on the phone, turning on GPS receiver, and dialing another predetermined number corresponding to where the stolen vehicle report is supposed to be transmitted.

A separate man-down switch maybe connected to the Microwire Interface so that an auxiliary switch may be utilized to turn on the phone, to turn on the GPS receiver, and dial yet another predetermined number and transmit the information to where the man-down report should be transmitted, such as a police station or other dispatch office.

A switch closure may correspond to a particular medical alert, with the switch closure then turning on the phone, turning on the GPS receiver and then dialing for instance, a hospital.

Thus it is the purpose of the subject invention to have a switch closure which turns on a phone should it be off, turns on the GPS receiver, and initiates the transmission of the latitude and longitude derived from the GPS receiver.

Note that the subject system includes other location providing devices such as Loran receivers, terrestrial GPS receivers, hyperbolic navigation receivers, and any device which reports location.

The CPU which handles all of the signaling is programmed initially so that a particular switch is identified. The program also specifies the telephone number to be dialed, and the information string to be delivered, be it verbal or digital, corresponding to the particular switch activated.

It will be appreciated that if the GPS receiver is only powered when the phone is turned on, this saves battery life with the respect to the hand-held portable device into which this is intended to be installed.

The Microwire Interface may also be utilized not only for pager activation which may be one of the switches, but also for any of the above-mentioned switch closures.

In summary, the particular switch is identified, the telephone number to be dialed is identified, the phone and the GPS are turned on, and the location information is transmitted.

In one embodiment, the pager activation is external to the device, with the pager to be connected to the device through either a hardwire, RF or a Blue-Tooth type connection.

The paging device may also be carried integral to the phone as long as its output is a simple switch closure.

What is therefore accomplished is remote activation of the wireless phone and the GPS report of location from switches results from the phone. Also included within the subject invention is local activation of the phone, assuming the switches are local to the phone.

In summary, a phone having a position determining device is turned on by a switch coupled to a switch identifying circuit or device for turning on the phone and the position determining device so that the phone can be made to call a predetermined number and report location. If the switch closure is a result of paging, a phone can be paged to report location whether or not the phone is initially off. This accommodates such applications as Alzheimer patients, truck-tracking, kid-tracking, pet-tracking and in general any application in which a wireless communications device such as a cell phone can be caused to report location, with the phone initially in an off condition. Alternative activations through the closure of specialized switches responsive to airbag deployment, car alarm activation, medical condition alerts, and perimeter violations, provides local activation of the system.

BRIEF DESCRIPTION OF THE DRAWINGS

These and other features of the subject invention will be better understood in connection with the Detailed Description in conjunction with the Drawings of which.

DETAILED DESCRIPTION

Figure 1:
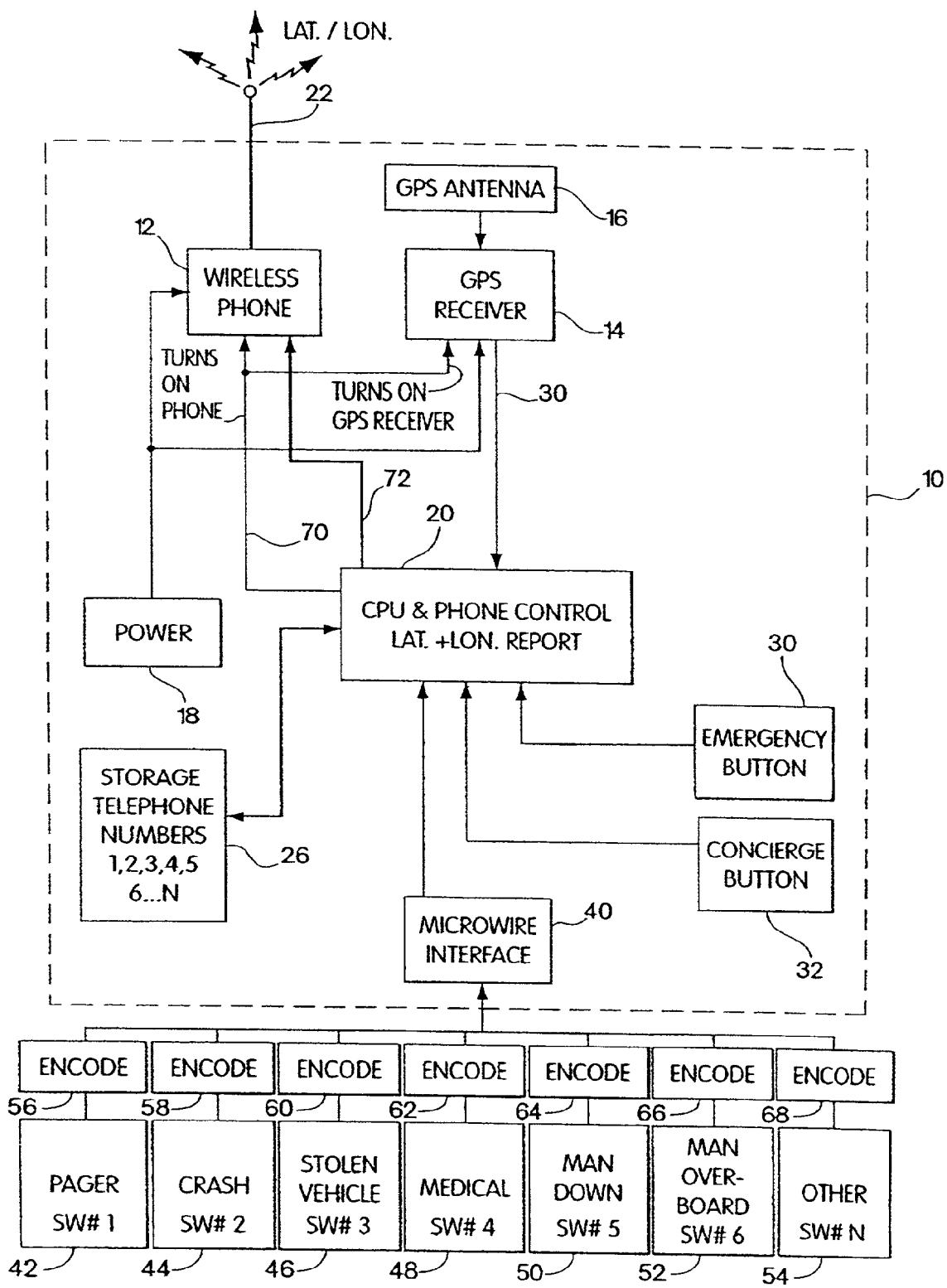
FIG. 1 is a block diagram indicating the utilization of a Microwire Interface has to power on a GPS-equipped cellular phone upon sensing switch closure and the identity of the switch has been encoded through the use of a Microwire Interface encoder.

Referring now to FIG. 1, an intergraded wireless device 10 includes a wireless phone 12 and an integrally carried GPS receiver 14 to which a GPS antenna 16 is coupled. A power source 18, which maybe a battery within the phone or an external power source is coupled both to wireless phone 12 and GPS receiver 14. Power is applied to turn on both the wireless phone and the GPS receiver through the control of a CPU 20 which controls the phone and generates the latitude and longitude report which is then transmitted via wireless phone 12 and via antenna 22 to a wireless network.

The location detected at phone 12 is coupled via NMEA0183 bus 30 to CPU 20 so that the latitude and longitude may be reported. In one embodiment this is reported through a synthetic voice rendition of the latitude and longitude over the voice channel of the phone, by a DTMF signal also over the voice channel or by any other signaling means such as CDPD, small message units, or modem transfer.

In addition to the location being reported, upon activation, the wireless phone is made to dial a telephone number, with the number stored in storage 26, and accessed by CPU 20.

It will be appreciated that the telephone number dialed can be made to correspond to a particular activation source, with one activation source being an emergency button 30 or a concierge/roadside assistance button 32.

A Microwire Interface 40 is coupled via a bus to a CPU 20, with the Microwire Interface circuit sensing switch closures such as shown by switches 42–54, with the switches respectively indicating a pager input, a crash sensor input, a stolen vehicle input, a medical condition input, a man-down input, a man overboard input, or some other sensor input.

Each of switches 42–54 is provided with an unique code by a Microwire Interface encoder module. Here the modules are illustrated at reference characters 56–68.

It is the purpose of the Microwire Interface, which is a two-wire interface, to decode which of the switches is closed and to cause CPU 20 to turn on the phone as illustrated over line 70 and also the GPS receiver. Thereafter in accordance with the decoded switch, a predetermined telephone number from memory 26 is utilized to cause the wireless phone to dial this predetermined number as illustrated by a signal on bus 72.

In this manner, upon sensing of a switch closure by Microwire Interface 40 both the wireless phone and the GPS receiver are turned on in case they were not already on.

What is therefore shown is a system for utilizing a switch to turn on a wireless phone and its GPS receiver and cause location to be broadcast to a remote site.

What will be appreciated is that the auxiliary switch may be identified and utilized to control the transmission of the latitude and longitude regardless of whether the wireless phone and GPS receiver is powered. This makes possible, for instance, the tracking of an item or an individual when the phone located at the item or an individual is turned off. Not only may a vehicle be tracked in this manner but also packages, containers and indeed anything carrying the wireless device.

It will appreciated that the wireless phones in general have a battery which is utilized to power the phone. Thus the provision of an individual, package, vehicle or other item with the phone provides a completely contained system for locating the individual package or vehicle or item without the phone having to be physically turned on or left on which drains the battery.

The Microwire Interface, in one embodiment, draws only approximately 10 micro-amps of current, which in some cases is less than the internal battery drain of a NICAD battery.

The result is that a GPS-equipped wireless phone may be carried on an individual, vehicle, package, or other item and left off until instructed to come on by a signal through the Microwire Interface bus.

Figure 2:
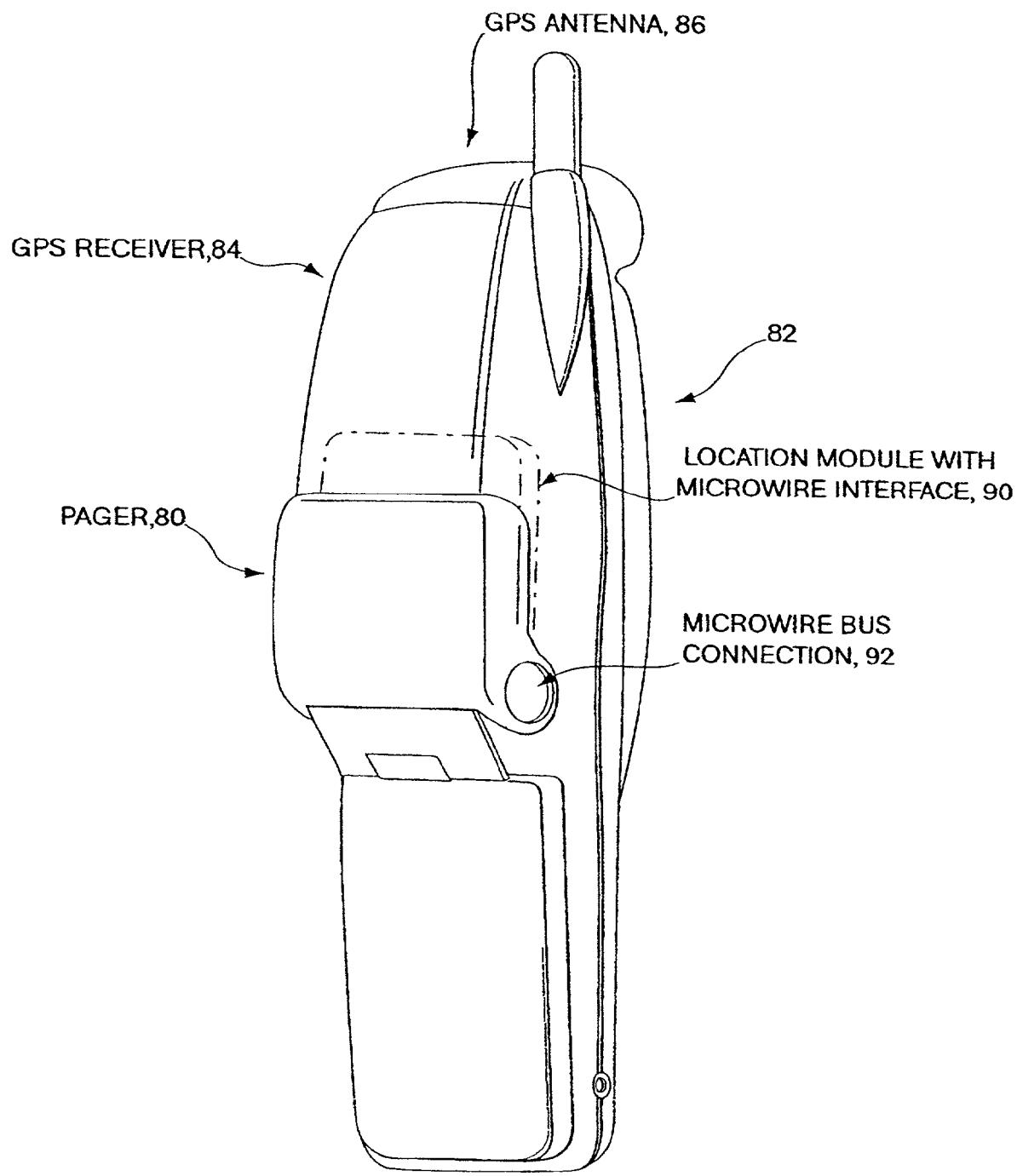
FIG. 2 is a diagrammatic illustration of the activation of a GPS-equipped phone through the utilization of a pager carried by the phone, the output of which is connected to the Microwire Interface bus; and, FIG. 3 shows an implementation of a pager-activated unit in which the pager is carried in a swingleable pod over the battery of the phone with the pager connected to the Microwire Interface thus through a connection from the pod to the Microwire Interface bus connector for the phone.

Referring now to FIG. 2, in one embodiment, namely the pager embodiment, a pager 80 is carried by a handset 82 which includes a GPS receiver 84 and its GPS antenna 86.

Internal to the phone is a location module and a Microwire Interface, here illustrated at 90 which has a Microwire bus connection 92 into which is plugged a mating connector on pager 80 so as to connect pager 80 to the Microwire bus and thus to a location reporting module within the phone.

Here pager 80 is carried on the back of the phone with a stereo plug being utilized for the Microwire bus connection and with the mating portion of the stereo connector carried by the location reporting module within the phone.

Figure 3:
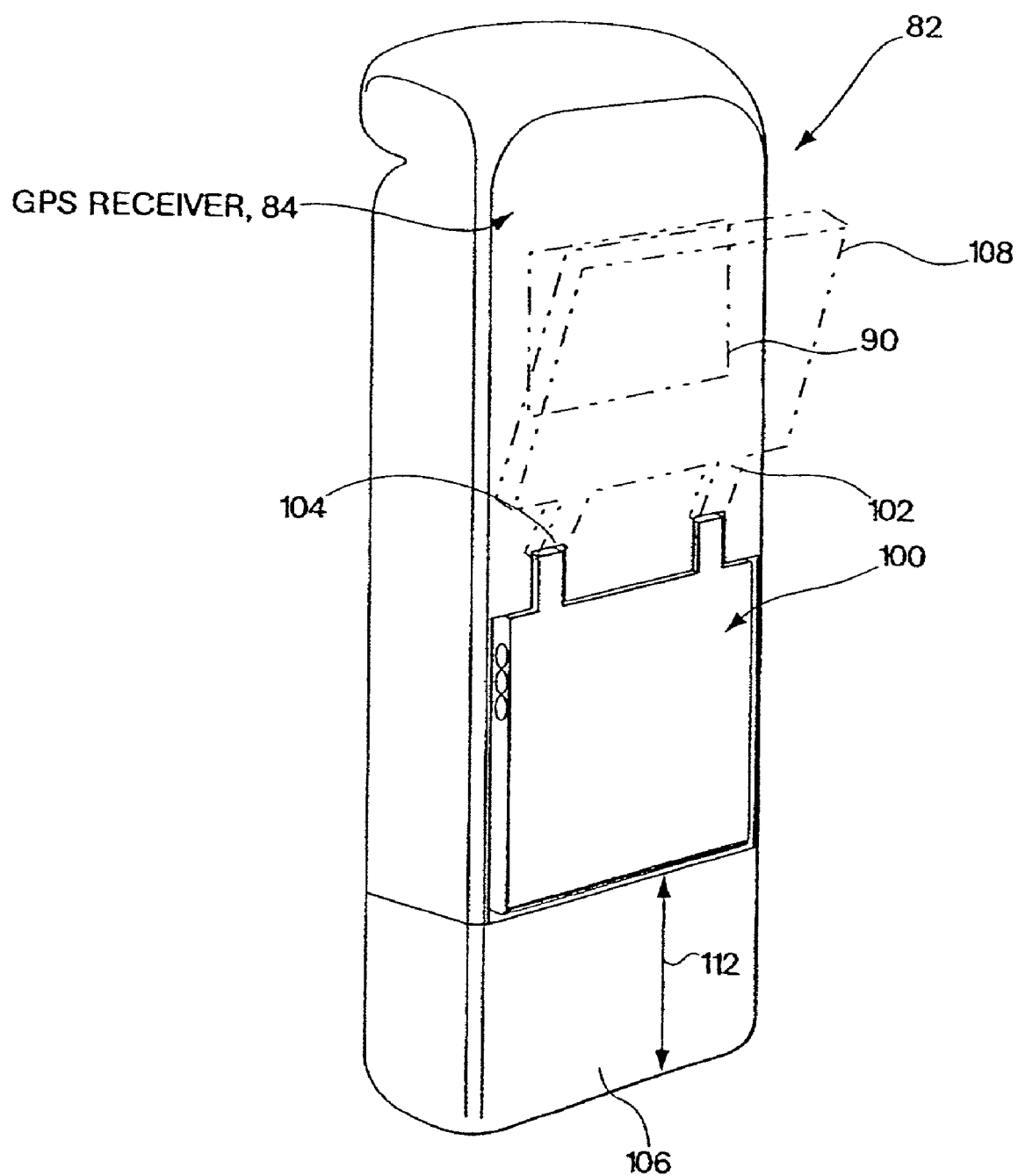

Referring to FIG. 3, phone 82 maybe provided with a pod 100 which can house any of variety of electronic components, one of which can be a pager 80 of FIG. 2.

Pod 100 is hinged via a hinged members 102 and 104 over battery 106 such that when it is desired to remove battery 106, pod 100 can be swung up to position shown by a dotted outline 108. In the illustrated embodiment, pod 100 does not extend all the way down to base 110 of phone 82 but rather extends only part of the way down to provide clearance 112 so that the phone may be positioned in a charger stand.

What is therefore provided is the utilization of a circuit which permits the identification of which switch is closed and provides this identification along with the fact of the switch closure to power up both a wireless phone and its corresponding location providing device to direct the call to a particular destination through the utilization, in one embodiment, of a telephone number, thus to transmit the location to a remote site which, in one embodiment, is a dispatch office.

It will also be appreciated that while the subject system has been described in connection with a wireless phone, any type of wireless device is within the scope of the subject invention, whether it is hand-held on not. Thus when a Microwire Interface is utilized to power on and activate any type of a transmitter for the report of a location it is within the scope of the subject invention.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. A method for controlling a wireless phone carrying a GPS receiver and coupled to a power source comprising the steps of:

providing a switch;

coupling the switch to a circuit capable of identifying the switch and providing an output corresponding to the identity of the switch and the fact of a switch closure; and, responsive to the output, turning on the phone and the GPS receiver, dialing a predetermined number corresponding to the identified switch and reporting GPS location through the use of the phone, the switch being an auxiliary switch, activation of the auxiliary switch causing the phone to turn on and to report the location of the GPS receiver, the auxiliary switch being selected from the groups consisting of crash-responsive switches, perimeter violation switches, vehicle intrusion switches, pager-activated switches, emergency switches, article theft switches, man-down switches and man-overboard switches.

2. The method of claim 1, wherein the power source is a battery, whereby battery power can be conserved until the switch is activated.

3. The method of claim 1, wherein the pager-actuated switch includes a pager mounted to the phone to provide for a remote activation of the phone for reporting position by paging the phone.

4. The method of claim 3, wherein the pager, GPS receiver and circuit are integral to the phone to provide a unitary device.

5. The method of claim 4, wherein the unitary device is a handheld unit.

6. A method of transmitting location from a first location to a second location, comprising the steps of:

providing a transmitter having a location providing device coupled thereto and a power source;

turning on the transmitter and the location providing device responsive to a predetermined auxiliary switch closure; and, causing the transmitter to transmit the location information to a predetermined entity determined by the identity of the predetermined switch, the transmitter including a phone having the capability of dialing a predetermined phone number associated with the predetermined entity, the identity of the switch being determined by the operation of a Microwire Interface bus.

7. The method of claim 6, wherein the phone and location providing device are integrally carried in a housing.

8. The method of claim 6, wherein the phone and location providing device are integrated to provide a handheld device.

9. The method of claim 6, wherein the location providing device is a GPS receiver.

* * * * *